United States Patent
Okawa

(10) Patent No.: US 11,084,231 B2
(45) Date of Patent: Aug. 10, 2021

(54) METHOD FOR PRODUCING THREE-DIMENSIONAL OBJECT AND FORMING APPARATUS

(71) Applicant: MIMAKI ENGINEERING CO., LTD., Nagano (JP)

(72) Inventor: Masakatsu Okawa, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 15/564,316

(22) PCT Filed: May 25, 2016

(86) PCT No.: PCT/JP2016/065415
§ 371 (c)(1),
(2) Date: Oct. 4, 2017

(87) PCT Pub. No.: WO2016/190341
PCT Pub. Date: Dec. 1, 2016

(65) Prior Publication Data
US 2018/0133979 A1    May 17, 2018

(30) Foreign Application Priority Data
May 25, 2015  (JP) .............................. JP2015-105461

(51) Int. Cl.
B29C 67/00    (2017.01)
B29C 64/264   (2017.01)
(Continued)

(52) U.S. Cl.
CPC ........ B29C 67/0007 (2013.01); B29C 64/112 (2017.08); B29C 64/209 (2017.08);
(Continued)

(58) Field of Classification Search
CPC ... B29C 64/112; B29C 64/209; B29C 64/268; B29C 67/0007; B29C 67/00; B29C 64/264; B29C 2795/00; B33Y 10/00; B33Y 30/00
See application file for complete search history.

(56) References Cited

U.S. PATENT DOCUMENTS

| 9,975,323 | B2* | 5/2018 | Chan ....................... B33Y 50/02 |
| 2004/0080078 | A1* | 4/2004 | Collins .................. B33Y 30/00 |
| | | | 264/245 |

(Continued)

FOREIGN PATENT DOCUMENTS

| DE | 102008045188 A1 | 3/2010 |
| WO | 2015138567 | 9/2015 |

OTHER PUBLICATIONS

"Poumidis, Dimitri, "Density & Dot Gain", 2008, Salmon Creek Publishing, https://www.flexoglobal.com/flexomag/08-July/flexomag-ploumidis.htm accessed May 15, 2019" (Year: 2008).*

(Continued)

*Primary Examiner* — Jacob T Minskey
*Assistant Examiner* — S. Behrooz Ghorishi
(74) *Attorney, Agent, or Firm* — Rankin, Hill & Clark LLP

(57) ABSTRACT

The thickness of a surface decoration layer is increased without significantly deteriorating the representation of the tone and the gradation of the color. A method for producing a three-dimensional object includes forming a surface decoration layer 11 using white material 15, at least one coloring material 13 other than white, and clear material 14, and using the at least one coloring material 13 and the clear material 14. The surface decoration layer 11 includes a plurality of layers formed by building a plurality of layer bodies one above the other. At least one of the layer bodies is formed with the white material 15 in at least one location (Continued)

among the lowermost layer of the surface decoration layer 11 and a region of an internal formation region 12 close to the surface decoration layer 11. The internal formation region constitutes an internal portion of the three-dimensional object. The plurality of layers constituting the surface decoration layer 11 includes the same color. When the plurality of layers are deposited, the density of the color visually recognized when the three-dimensional object is observed is adjusted to be greater than the density of the color of each of the plurality of layers.

9 Claims, 8 Drawing Sheets

(51) Int. Cl.
| | | |
|---|---|---|
| *B29C 64/112* | (2017.01) | |
| *B29C 64/209* | (2017.01) | |
| *B33Y 10/00* | (2015.01) | |
| *B33Y 30/00* | (2015.01) | |

(52) U.S. Cl.
CPC ............ *B29C 64/264* (2017.08); *B29C 67/00* (2013.01); *B29C 2795/00* (2013.01); *B33Y 10/00* (2014.12); *B33Y 30/00* (2014.12)

(56) References Cited

U.S. PATENT DOCUMENTS

| | | | |
|---|---|---|---|
| 2010/0195122 A1* | 8/2010 | Kritchman | G05B 15/02 |
| | | | 358/1.9 |
| 2015/0258770 A1* | 9/2015 | Chan | B33Y 50/02 |
| | | | 700/98 |

OTHER PUBLICATIONS

Halftoning methods U of Texas (users.ece.utexas.edu/~bevans/projects/halftoning/methods.html), accessed Aug. 12, 2020 (Year: 2007).*

Extended European Search Report (EESR) dated May 4, 2018 issued in the corresponding European patent application No. 16800045.3.

* cited by examiner

- 1% Color
- 2% Color
- 3% Color
- 4% Color
- 5% Color
- 6% Color
- 7% Color
- 8% Color
- 9% Color
- 10% Color Per One Layer:
Clear 100% + Color 4%
Total of 30 Layers:
Clear 3000% + Color 120%

Per One Layer:
Clear 100% + Color 0.4%
Total of 30 Layers:
Clear 3000% + Color 12%

METHOD FOR PRODUCING THREE-DIMENSIONAL OBJECT AND FORMING APPARATUS

TECHNICAL FIELD

The present invention relates to a method for producing a three-dimensional object formed with an ink-jet printer in a colored state and to a forming apparatus. More specifically, the present invention relates to a method for producing, for example, a surface-decorated three-dimensional object that includes a thick-coating surface decoration made of multiple layers, and to a forming apparatus.

BACKGROUND ART

Conventionally, an object, that is, a three-dimensional model of an object to be formed has been generated by performing three-dimensional formation that involves successively depositing resin onto cross-sections of a three-dimensional object that are obtained by slicing the three-dimensional object into a plurality of parallel surfaces. In order to color such a three-dimensional object, a previously colored formation resin is used. However, the conventional three-dimensional object is formed of a single resin material and has only a single color. A configuration for forming a three-dimensional object using material (such as ink) having a plurality of colors has also been proposed. However, in this case also, the number of colors that can be expressed is generally limited.

Thus, in a case in which the three-dimensional object needs to be colored, a designer needs to draw patterns or perform coloring in the following process. This, unfortunately, requires excessive time and costs. That is, in order to produce a three-dimensional object having a plurality of colors or any mixed color, the conventional method is unable to generate a final three-dimensional object in a short time and with low costs, but requires manual work after formation.

Given these circumstances, it has been proposed to generate a three-dimensional object of an object to be formed having colored surfaces (patent document 1) by extruding coloring material for the surface layer of the three-dimensional object, extruding formation resin at the inner region, forming layer bodies corresponding to the cross-sections obtained by slicing the object to be formed into a plurality of parallel surfaces, and successively depositing the layer bodies. In this three-dimensional object, white (W) ink is used as the formation resin to represent bright colors or the tone and the gradation of colors that cannot be represented by only three colors Y, M, and C. In some cases, the white ink is extruded only on the surface layer of the three-dimensional object as required together with the three colors Y, M, and C based on the color information derived from the object to be formed. However, in a case in which the white ink is used as the formation resin, the white ink serves as the paper (substrate) in the general 2D printing. Thus, the white (W) resin is not used on the colored layer of the surface layer, and the colored layer is colored with only the three colors Y, M, and C. In this case, the coloring material (ink) is generally extruded to only the surface of the three-dimensional object.

RELATED ART DOCUMENTS

Patent Documents

Patent document 1: Japanese Unexamined Patent Application Publication No. 2000-280357

DISCLOSURE OF THE INVENTION

Problems to be Solved by the Invention

Since only one layer on the surface is decorated, like the two-dimensional (2D) printing performed on a two-dimensional (2D) print medium such as paper in which the color is completed by one layer, the coloring with wide gamut can be performed. However, depending on the angle from which the object is viewed, the inside may be seen through, or if for example part of the colored surface is chipped, the white section inside the three-dimensional object might be exposed. Since the three-dimensional object is viewed from any direction, it is sometimes preferable to prevent the object from appearing to have different colors depending on the angle from which the object is viewed by providing the decoration layer with a plurality of layers to be thick. Furthermore, since the surface of the three-dimensional object is often polished after formation, it is desirable that the three-dimensional object be decorated thickly.

In a case in which ink that is capable of coloring in one layer of ink is used like the ink used in the two-dimensional (2D) printing, if the coating thickness of the entire decoration layer is increased by forming the decoration layer with a plurality of ink layers deposited one above the other, the decoration layer darkens and appears to be blackish regardless of the color used due to the feature of the subtractive mixing since the density of the ink itself is fixed and cannot be controlled partially. Thus, in a case in which the decoration layers are deposited one above the other to increase the coating thickness, bright colors that cannot be represented by only three colors Y, M, and C and the tone and the gradation of the color cannot be represented.

Conventionally, for example, a method for adjusting the density of the color by adjusting the coating thickness of the decoration layer has also been proposed. In this case, a section that needs to be colored with a light color has a thin coating thickness, and a section that needs to be colored with a deep color has a great coating thickness. However, in this case, it is difficult to represent the tone of the color with a uniform coating thickness (constant coating thickness). In other words, the coating thickness cannot be made constant unless resin material, that is, ink having different densities is prepared previously.

In contrast, it is an object of the present invention to provide a method for producing a three-dimensional object that is capable of increasing the thickness of a surface decoration layer without significantly deteriorating the representation of the tone and the gradation of the color and to provide a forming apparatus.

Means of Solving the Problems

In order to achieve the object, a method for producing a three-dimensional object according to one aspect of the present invention includes injecting a plurality of materials in fine particles to form layer bodies corresponding to cross-sections obtained by slicing an object to be formed into a plurality of parallel surfaces. The plurality of materials includes white material, at least one coloring material other than white, and clear material that solidify in accordance with a predetermined condition after being extruded from a nozzle. Injecting the plurality of materials includes forming a surface decoration layer using the at least one coloring material and the clear material. The surface decoration layer includes a plurality of layers formed by building the plurality of layer bodies one above the other. The plurality of layers constituting the surface decoration layer includes the same color. When the plurality of layers are deposited, the density of the color visually recognized when the three-dimensional object is observed is adjusted to be greater than the density of the color of each of the plurality of layers. At least one of the layer bodies is formed with the white material in at least one location among the lowermost layer of the surface decoration layer and a region of an internal formation region close to the surface decoration layer. The internal formation region constitutes an internal portion of the three-dimensional object. The layer bodies are successively deposited to form the three-dimensional object.

The plurality of materials, that is, the white material, the coloring material, and the clear material are not limited to specific materials, but are preferably materials that solidify in accordance with a predetermined condition after being extruded from the nozzle such as an ultraviolet curable ink, an electron beam curable ink, a thermosetting ink, or a hot melt resin. In this case, the statement that "the material is solidified" refers to a state in which the material is cured by, for example, polymerization reaction. The material preferably solidifies instantly upon landing after being extruded from the nozzle. The material is, more preferably, an ultraviolet curable ink or an electron beam curable ink, and the most preferably, an ultraviolet curable ink.

In the first aspect of the present invention, each of the plurality of layers constituting the surface decoration layer may be a colored layer to which the color is applied by a density obtained by equally dividing a predetermined desired density.

In the first aspect of the present invention, the at least one of the layer bodies formed with the white material may be formed in at least one location among the lowermost layer of the surface decoration layer and a region in the internal formation region adjacent to the surface decoration layer.

In the first aspect of the present invention, when an average diameter of a dot of the coloring material formed by a liquid droplet that is extruded from the nozzle and is solidified is compared with the thickness of the surface decoration layer formed by depositing the plurality of layers, the thickness of the surface decoration layer may be greater than the average diameter of the dot.

In the first aspect of the present invention, the thickness of the surface decoration layer formed by depositing the plurality of layers may be equal to or more than 50 µm. The thickness of the surface decoration layer is preferably 80 µm or more, and more preferably 100 µm or more. The thickness of the surface decoration layer may be 100 to 500 µm. The thickness of the surface decoration layer may be 80 to 200 µm, and more preferably 100 to 150 µm.

In the first aspect of the present invention, in the plurality of layers constituting the surface decoration layer, the dot positions of the coloring material of the same color may be prevented from being aligned among at least adjacent two of the layer bodies. In this case, it is preferable to set such that the dot positions of the same coloring material do not align among a predetermined (for example, predetermined integer of three or more) plurality of layers that are continuously deposited.

The method for controlling such that the dot positions of the coloring material are not aligned may include, for example, a method for moving a mask (dither mask) for selecting the dot positions each layer by layer. In this case, more specifically, a method for translating or rotating the mask may be employed. Alternatively, the type of the mask (mask type) that is used may be changed each layer by layer. Furthermore, a method for using a three-dimensional mask (such as three-dimensional dither mask) may be employed. When an error diffusion is used, a method for changing the weight of the error diffusion each layer by layer (randomly performing the error diffusion) or a method for performing the error diffusion in three-dimension may be employed.

In the first aspect of the present invention, the plurality of materials may include an ultraviolet curable ink.

According to another aspect of the present invention, an apparatus for forming a three-dimensional object includes injecting a plurality of materials in fine particles to form layer bodies corresponding to cross-sections obtained by slicing an object to be formed into a plurality of parallel surfaces. The plurality of materials includes white material, at least one coloring material other than white, and clear material that solidify in accordance with a predetermined condition after being extruded from a nozzle. Injecting the plurality of materials includes forming a surface decoration layer using the at least one coloring material and the clear material. The surface decoration layer includes a plurality of layers formed by building the plurality of layer bodies one above the other. The plurality of layers constituting the surface decoration layer includes the same color. When the plurality of layers are deposited, the density of the color visually recognized when the three-dimensional object is observed is adjusted to be greater than the density of the color of each of the plurality of layers. At least one of the layer bodies is formed with the white material in at least one location among the lowermost layer of the surface decoration layer and a region of an internal formation region close to the surface decoration layer. The internal formation region constitutes an internal portion of the three-dimensional object. The layer bodies are successively deposited to form the three-dimensional object.

Effects of the Invention

With the method for producing a three-dimensional object according to claim 1, a layer of the white material is formed inside the surface decoration layer, and the surface decoration layer is formed with the coloring material and the clear material. The surface decoration layer including a plurality of layers represent the color of a desired density. In this case, while reducing the amount of discharge of the coloring material per each layer, the coating thickness is increased by providing the clear material to compensate for the reduced amount. Thus, although the thickness of the surface decoration layer is increased, the color is prevented from darkening, and the color of a desired density is represented in a suitable manner. That is, with this configuration, good coloring performance is achieved, and the gradation is reliably represented although the surface decoration layer is multilayered to increase the thickness. Thus, the tone and the gradation of the color are represented with a constant coating thickness.

The clear material and the coloring material are used to form each layer of the surface decoration layer. Thus, since the color of a desired depth is reproduced by depositing a plurality of lightly colored layers to increase the thickness, dots for coloring are dispersed in the direction in which the layers are deposited, that is, the depth direction. In this case, compared with a case in which the area ratio of the section that includes the coloring materials is increased in each layer, and in which the coloring material of the same color is built one above the other at the same position, the density of the color of the visually recognized dots is decreased. This reduces the granular appearance. In a case in which the coloring is performed with the conventional method, the three-dimensional object may appear to be in the water, and the color resolution may seem to be decreased. In contrast, with the above-described configuration, the three-dimensional object is prevented from being perceived to have a low color resolution.

With the method for producing a three-dimensional object according to claim 2, the density of the color of each layer of the surface decoration layer is easily set in a suitable manner. Thus, the coloring using a thick surface decoration layer is performed in a more suitable manner.

With the method for producing a three-dimensional object according to claim 3, the layer of the white material, which functions as a substrate for representing color in the surface decoration layer, is formed in a suitable manner. Thus, the coloring by the subtractive mixing is performed in a more suitable manner.

With the method for producing a three-dimensional object according to claim 4, the thickness of the surface decoration layer is sufficiently increased in a suitable manner.

If the thickness of the surface decoration layer is small, cracking or chipping that occurs in the vicinity of the surface of the three-dimensional object may possibly expose the color inside the three-dimensional object. In a case in which the thickness of the surface decoration layer is small, if the thickness of the surface decoration layer is changed by polishing the three-dimensional object, the density of the color may possibly be decreased by a large amount or the color may become invisible. Thus, the surface decoration layer desirably has a thickness to some extent or more. In contrast, with this configuration, the thickness of the surface decoration layer is greater than the average diameter of the dot. Thus, the thickness of the surface decoration layer is sufficiently increased in a suitable manner.

In this case, each layer of the surface decoration layer is colored with a low density. Thus, even if cracking or chipping occurs in part of the surface decoration layer, or if the thickness of the surface decoration layer is changed to some extent by polishing, the influence on the color that is visually recognized is reduced in a suitable manner. Thus, with this configuration, coloring using the thick surface decoration layer is performed in a more suitable manner.

Furthermore, in this case, with regard to the impression given when the three-dimensional object is visually recognized, the three-dimensional object gives the impression as if the three-dimensional object has been colored from the inside in a suitable manner. Additionally, by reducing the density of the color of each layer of the surface decoration layer, for example, coloring that gives glossy appearance may be performed.

With the method for producing a three-dimensional object according to claim 5, the thickness of the surface decoration layer is sufficiently increased in a suitable manner. Thus, coloring that uses the thick surface decoration layer is performed in a suitable manner.

With the method for producing a three-dimensional object according to claim 6, by displacing the dot positions of the coloring material of the same color in the layers that are built one above the other in the layer direction of the surface decoration layer, the difference in the brightness between the surface decoration layer and the layer of the white material, which functions as a substrate on which the color is represented, is reduced in a suitable manner. This also makes the individual dots of the coloring materials to be inconspicuous and reduces the granular appearance in a suitable manner.

With the method for producing a three-dimensional object according to claim 7, the layers constituting the three-dimensional object are formed in a more suitable manner.

With the method for producing a three-dimensional object according to claim 8, the advantageous effects similar to the advantageous effects of the invention according to claim 1 are provided.

BRIEF DESCRIPTION OF THE DRAWINGS

FIG. 2(A) is a front upper perspective view of the exemplary three-dimensional object. FIG. 2(B) illustrates cross-sections of each section of the exemplary three-dimensional object. (B-1) is a cross-sectional view of only the surface decoration layer on the upper surface. (B-2) is a cross-sectional view of the surface decoration layer and the internal formation region. (B-3) is a cross-sectional view of only the surface decoration layer on the bottom surface.

MODES FOR CARRYING OUT THE INVENTION

Figure 1:
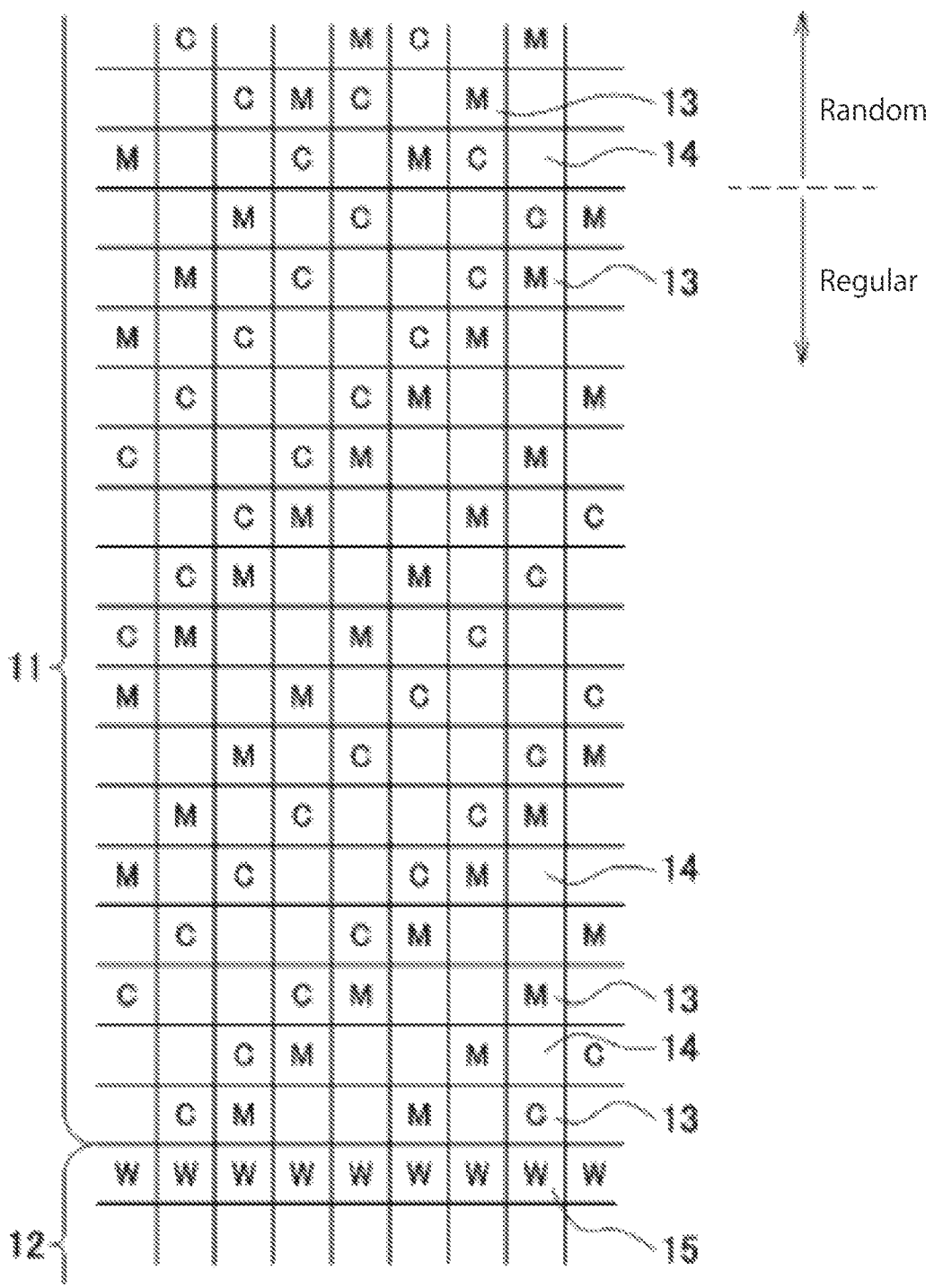
FIG. 1 is a diagram illustrating an exemplary arrangement state of a plurality of materials constituting layers of a surface decoration layer and an internal formation region of a three-dimensional object according to the present invention.

Hereinafter, a configuration of the present invention will be described based on the embodiments illustrated in the drawings. FIG. 1 illustrates an exemplary three-dimensional object produced by a producing method according to one embodiment of the present invention. The three-dimensional object according to this embodiment is formed by injecting a plurality of materials in fine particles to form layer bodies corresponding to cross-sections obtained by slicing an object to be formed into a plurality of parallel surfaces and successively depositing the layer bodies. The plurality of materials are extruded from nozzles and are instantly solidified upon landing. Such materials are injected from an ink-jet printer in fine particles to continuously form a surface decoration layer 11 and an internal formation region 12 in a formation process. In this manner, the three-dimensional object is obtained that includes the surface decoration layer 11 of great thickness that has coloring or drawing involving the tone and the gradation of the color on the surface.

The plurality of materials constituting the three-dimensional object include a white material 15 and at least one coloring material 13 other than white that are extruded from the nozzles and are instantly solidified upon landing. The internal formation region 12 is formed with the white material 15, and the surface decoration layer 11 is formed with the at least one coloring material 13 and a clear material (transparent material) 14. In this embodiment, the white material 15 includes a white (W) ultraviolet curable ink, and the at least one coloring material 13 other than white includes an ultraviolet curable ink of yellow (Y), magenta (M), cyan (C), and if necessary black (K). The clear material 14 includes an ultraviolet curable clear (CL) ink. In FIG. 1, cells without the symbols W, Y, M, C, and K indicate that the clear (CL) ink is jetted.

The coloring materials, which are surface decoration inks (also referred to as coloring inks) 13 in this embodiment, may be inks including the aforementioned three primary colors Y, M, and C. All the color components including intermediate colors are preferably colored on the surface decoration layer 11 by mixing these inks in accordance with area distribution. However, inks of other color components, for example, R (red), G (green), and B (blue) may be used. Alternatively, both the Y, M, and C inks and R, G, and B inks may be used. Furthermore, a black (K) ink may be used to reproduce clearer black.

In this manner, while forming the internal formation region 12 using the white ink 15, the surface decoration layer 11 is configured by a group of droplets of the surface decoration inks 13 including Y, M, C, and if necessary K. This allows a mixed color or the gradation of the color to be represented by both subtractive mixing and optical color mixing. In general, three primary colors Y, M, C are mixed for coloring. However, to represent the tone of the color, it is effective to extrude the clear ink 14 simultaneously with the surface decoration inks 13 of the three primary colors to mix the color in accordance with the area distribution. Utilizing the white color of the internal formation region 12, which functions as the base material, eliminates the need for the white ink 15 for representing the tone of the color and theoretically enables the tone of each color component to be represented by only using three colors Y, M, and C and bright colors that cannot be represented by only the three colors Y, M, and C to be represented. Thus, the tone and the gradation of the color are reproduced on the thick surface decoration layer 11. However, this configuration does not particularly limits the use of the white ink 15 on the surface decoration layer 11.

In this embodiment, the internal formation region 12 is entirely formed with the white ink 15. The surface decoration layer 11 is formed to have a certain thickness while inhibiting the color from becoming excessively deep by forming lightly colored layers using one coloring ink 13 or two or more coloring inks 13 together with the clear ink 14 and depositing such lightly colored layers one above the other to complete the color. In other words, the surface decoration layer 11 is formed with the coloring materials 13 and the clear material 14 such that, when all the layers are built one above the other, the ink density becomes equal to the ink density achieved by one layer in a case of forming the decoration layer with one layer. In this case, a plurality of layers having evenly divided same density are built one above the other so that, while reducing the amount of discharge of the coloring materials 13 per each layer, the coating thickness is increased by providing the clear material 14 to compensate for the reduced amount. That is, the coloring per one layer is lightened by reducing the amount of discharge of the coloring materials 13 per each layer and providing the clear material 14 to compensate for the reduced amount. Such a light color is deposited one above the other so that although the coating thickness is increased, the color does not become excessively deep. Thus, although the surface decoration layer 11 is multilayered to increase the thickness, the color is prevented from becoming dark, and the color is achieved that has the same depth as the case in which the surface decoration layer is formed with one layer. This configuration achieves good coloring performance and reliably represents the gradation although the surface decoration layer 11 is multilayered to increase the thickness. Thus, the tone and the gradation of the color are represented with a constant coating thickness.

In this embodiment, the ink density per one layer of the surface decoration layer 11, that is, the lightness of the color of each layer is determined such that when 30 layers are deposited one above the other, the color appears to have a desired depth. That is, the surface decoration layer 11 including the plurality of layers formed around the internal formation region 12 is configured such that a desired color is obtained by depositing 30 layers each having the same density obtained by evenly dividing the ink density of each coloring material 13. Thus, although the surface decoration layer 11 has a certain thickness, the surface decoration inks 13 do not become excessively dense.

As described above, in this embodiment, in a case in which the surface decoration layer 11 configured by the plurality of layers is formed using the coloring materials 13 and the clear material 14, the surface decoration layer 11 is formed on the outer side of the internal formation region 12, and the plurality of layers constituting the surface decoration layer 11 are formed with the same color. In this case, in the configuration in which the surface decoration layer 11 is formed on the outer side of the internal formation region 12, at least one layer body formed with the white material, which is the white ink 15 in this embodiment, is formed at the lowermost layer of the surface decoration layer 11 or in a region of the internal formation region 12 adjacent to the surface decoration layer 11. In this embodiment, the internal formation region 12 is formed with the white ink 15 so that a layer body formed with the white material is formed adjacent to the lowermost layer of the surface decoration layer 11. Additionally, in this embodiment, by depositing a plurality of lightly colored layers, the density of the color that is visually recognized when a finished three-dimensional object is observed is adjusted to be greater than the density of the color of each layer of the surface decoration layer 11. With this configuration, the density of the color after depositing is adjusted to achieve a desired depth.

Thus, according to this embodiment, the surface decoration layer 11 including the plurality of layers is capable of representing a wide variety of colors with a desired density in a suitable manner. In this case, while reducing the amount of discharge of the coloring material per each layer, the coating thickness is increased by providing the clear material to compensate for the reduced amount. Thus, although the thickness of the surface decoration layer 11 is increased, the color is prevented from becoming dark, and the color with a desired density is represented in a suitable manner. That is, with this configuration, although the surface decoration layer 11 is multilayered to increase the thickness, good coloring performance is achieved, and the gradation is reliably represented. Thus, the tone and the gradation of the color are represented in a suitable manner with the constant coating thickness.

In this case, the thickness of the surface decoration layer 11 is preferably 50 μm or more. The thickness of the surface decoration layer 11 is preferably 80 μm or more, and more preferably 100 μm or more. The thickness of the surface decoration layer 11 may be 100 to 500 μm. Alternatively, the thickness of the surface decoration layer 11 may be 80 to 200 μm, and preferably 100 to 150 μm. In other respects, when the average diameter of one dot of the coloring materials 13 is compared with the thickness of the surface decoration layer 11, the thickness of the surface decoration layer 11 is preferably greater than the average diameter of the dot. The average diameter of the dot is approximately 100 μm (80 to 150 μm).

If the thickness of the surface decoration layer 11 is small, for example, cracking or chipping may occur near the surface of the three-dimensional object, and the internal color of the three-dimensional object may possibly be exposed. In a case in which the thickness of the surface decoration layer 11 is small, if the thickness of the surface decoration layer 11 is changed by polishing the three-dimensional object, the density of the color may possibly be decreased by a large amount, or the color may possibly disappear. Thus, the surface decoration layer 11 desirably has a thickness to a certain extent or more. In contrast, with the above-described configuration, the thickness of the surface decoration layer 11 is sufficiently increased in a suitable manner.

In this embodiment, each layer of the surface decoration layer 11 is colored with a low density. Thus, even if cracking or chipping occurs in part of the surface decoration layer 11, or if the thickness of the surface decoration layer 11 is changed to some extent by polishing, the influence on the color that is visually recognized is reduced in a suitable manner. Thus, with this configuration, coloring using the thick surface decoration layer 11 is performed in a more suitable manner.

Furthermore, in this case, with regard to the impression given when the three-dimensional object is visually recognized, the three-dimensional object gives the impression as if the three-dimensional object has been colored from the inside in a suitable manner. Additionally, by sufficiently reducing the density of the color of each layer of the surface decoration layer 11, for example, coloring that gives glossy appearance may be performed. In this case, since the surface decoration layer 11 includes a plurality of layers deposited one above the other, dots for coloring can be dispersed in the direction in which the layers are deposited, that is, in the depth direction. This configuration decreases the density of the color of the dots that are visually recognized compared with a case in which a plurality of coloring materials are built one above the other in one layer. Additionally, this configuration reduces the granular appearance in a suitable manner.

In this embodiment, more specifically, 30 layers each having an ink thickness of approximately 12 to 13 μm per one layer are deposited one above the other to obtain the surface decoration layer 11 having a thickness of approximately 350 μm. The thickness of the surface decoration layer 11 does not necessarily have to be limited particularly to approximately 350 μm, but may of course be set to the thickness and the number of layers as required. Since the decoration layer in the general 2D printing is approximately 10 to 50 μm, it is assumed that a thickness of approximately 100 to 500 μm will be desired. In this case also, this specification reveals that the surface decoration layer 11 that is capable of representing the tone and the gradation of the color can be formed. Likewise, the number of the layers of the surface decoration layer 11 does not necessarily have to be limited particularly to 30 layers. The number of the layers is just an example of a case in which the thickness of the surface decoration layer is assumed to be 350 μm.

The present inventors used the ultraviolet curable inks of white (trade name, UV ink LH-100W: product No. SPC-0597W), cyan (trade name, UV ink LH-100C: product No. SPC-0597C), magenta (trade name, UV ink LH-100M: product No. SPC-0597M), yellow (trade name, UV ink LH-100Y: product No. SPC-0597Y), and clear (UV ink LH-100CL: product No. SPC-0597CL) manufactured by MIMAKI ENGINEERING CO., LTD. to conduct the evaluation test of the present invention. It was determined that the best coloring performance was achieved when the color blending density was 4% in the evaluation test conducted by the present inventors.

Thus, when the above-mentioned ultraviolet (UV) inks are used to build 30 layers on one another with the color blending density of 4% per one layer set as the ink limit and the clear ink set to 100%, although the surface decoration layer is multilayered to have a thickness of approximately 350 μm that is 10 or more times the thickness of the decoration layer in 2D printing, good coloring performance is achieved, and the gradation is reliably represented. Thus, the tone and the gradation of the color are represented with the constant coating thickness. When the coloring ink of a single color such as cyan is used, the ink blending amount per one layer in this case is 4% coloring ink and 100% clear ink resulting in the total ink amount of 104% and the ink thickness of 12.48 μm. When two colors of the coloring inks C and M are used, 4% each coloring ink and 100% clear ink result in the total ink amount of 108% and the ink thickness of 12.96 μm. When three colors of the coloring inks C, M, and Y are used, 4% each coloring ink and 100% clear ink result in the total ink amount of 112% and the ink thickness of 13.44 μm.

In the above description, the amounts of the coloring inks and the clear ink are represented in relative percentages for convenience of the description. That is, the amount of the clear ink is assumed to be 100%, and the amount of the coloring inks is represented in a relative percentage. Thus, the total ink amount results in a value that exceeds 100%. However, in the actual forming process, it is necessary to make the total ink amount to be constant regardless of the amount of the coloring ink to make the thickness of each layer constant. Thus, the actual amounts of the coloring inks and the clear ink are preferably adjusted as required such that the total ink amount is constant while maintaining the above-mentioned ratio. With this configuration, the coating thickness of each layer to be formed is controlled to be constant.

With the configuration described above, the amount of the coloring ink of each color is set to 4%. However, the amount of the coloring ink is preferably set in accordance with the density of the ink as required. When light ink is used as the coloring ink, the amount of the coloring ink of each color may be set to, for example, approximately 20%.

The above-described embodiment mainly describes an example of a case in which the surface decoration layer 11 includes 30 layers and have a thickness of 350 sum. In this case, the lightness of the color in each layer is evenly divided to have the same density such that when the 30 layers are deposited on one another, the surface decoration layer 11 is perceived to have the color of a desired depth. This configuration is an example of a case in which each of the plurality of layers constituting the surface decoration layer 11 is colored with a density obtained by evenly dividing the predetermined desired density. In this case, each layer may be colored by a 1/N density obtained by dividing the entire density that is previously set as the entire density of the surface decoration layer 11 by the number of layers N. With this configuration, the color density of each layer of the surface decoration layer 11 is easily set in an appropriate manner. Thus, coloring that uses the thick surface decoration layer 11 is performed in a suitable manner.

However, the method for coloring each layer of the surface decoration layer 11 is not particularly limited to the above configuration. All the layers of the surface decoration layer 11 do not necessarily have to be colored, but dots of the coloring materials 13 may be formed on only some of the layers. The density of each layer does not necessarily have to be set evenly (1/N), but each layer may be colored in different density.

In this case, each layer may be colored such that the density changes in a pyramid shape in which the closer the surface, the less becomes the density. With this configuration, by reducing the density of the color in the vicinity of the surface of the three-dimensional object, coloring that gives, for example, glossy appearance is performed. Each layer may be colored such that the density changes in a reverse pyramid shape in which the closer the surface, the greater becomes the density. With this configuration, by increasing the density of the color in the vicinity of the surface of the three-dimensional object, the three-dimensional object can be colored more vividly.

In the above description, the case in which the layers of the surface decoration layer 11 are colored with the same color is mainly described. In this case, to vary the density of the color of each layer, the ratio of the ink of each color is set to be the same, and each layer is colored with the same color in different density. However, as long as the entire surface decoration layer 11 is colored with the desired density and the desired color, theoretically, the layers of the surface decoration layer 11 do not necessarily have to be colored with the same color. Thus, the arrangement of the dots of each color in the surface decoration layer 11 may be dispersed in the depth direction (thickness direction).

In the above-described embodiment, the formation ink 15, the surface decoration ink 13, and the clear ink 14 are ultraviolet curable inks. However, the formation ink 15, the surface decoration ink 13, and the clear ink 14 are not particularly limited to the ultraviolet curable inks. Depending on the circumstances, the formation ink 15, the surface decoration ink 13, and the clear ink 14 may be curable inks that are cured by exposure to light other than ultraviolet light (for example, visible light) or electron beam (EB) or thermosetting inks. In this case, the ultraviolet light emitter is unnecessary. Instead, an energy emitting device for curing the ink adhered to the stage is necessary. When a hot melt resin is used, it is obvious that a heating device is necessary for supplying melt resin to the nozzles.

Figure 8:
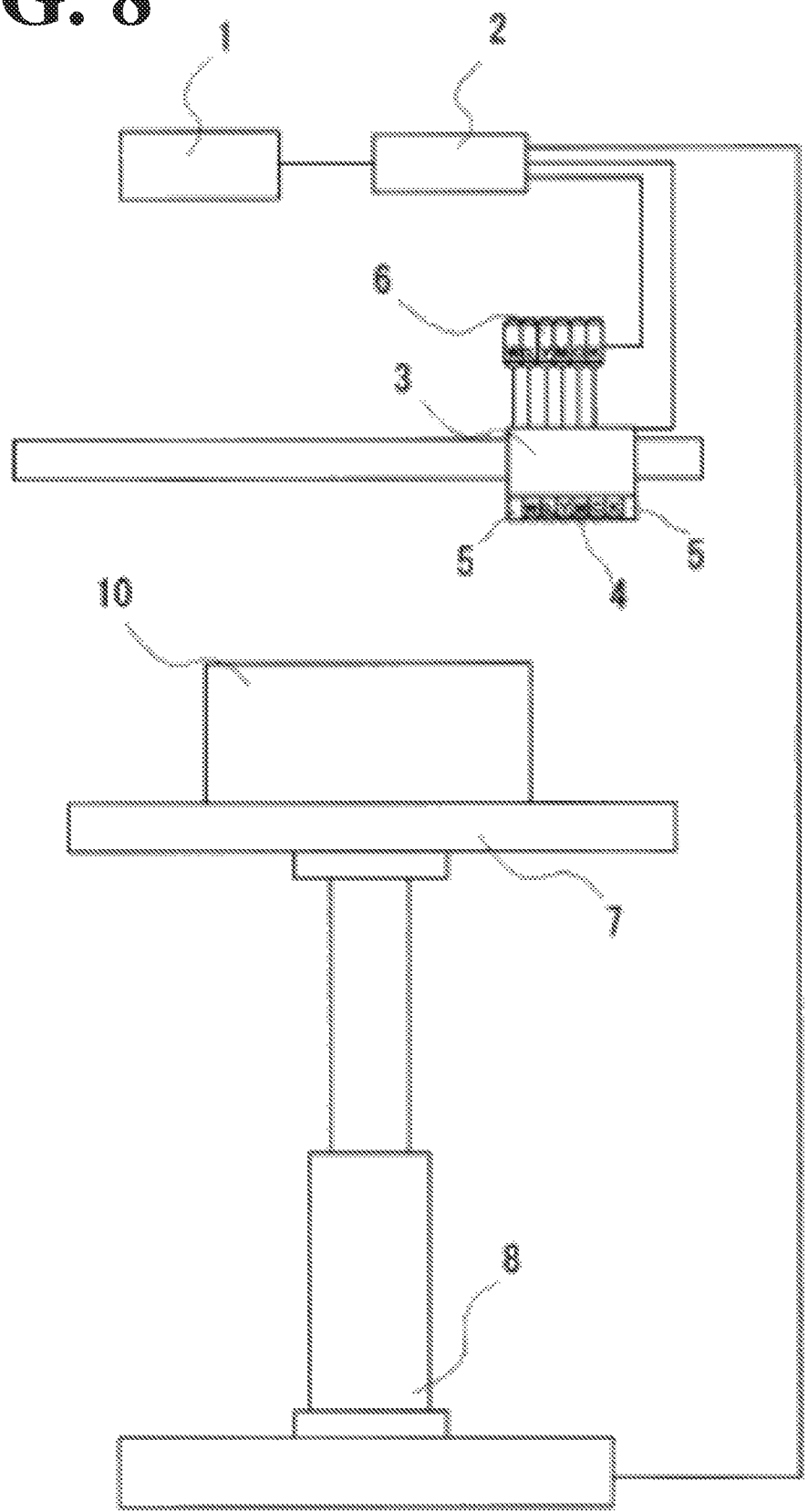
FIG. 8 illustrates an exemplary apparatus for forming a surface-decorated three-dimensional object according to the present invention.

FIG. 8 is a schematic view illustrating an exemplary three-dimensional forming apparatus. The three-dimensional forming apparatus includes a computer 1, a drive controller 2, an XY-direction driver 3, a Z-direction driver 8, a nozzle head 4, tanks 6, ultraviolet light emitters 5, and a stage 7.

The computer 1 transforms a three-dimensional object to be formed into data, creates cross-sectional data obtained by slicing the object to be formed into multiple thin cross-sectional bodies, and outputs the data to the drive controller 2. Simultaneously, the computer 1 outputs, to the drive controller 2, information of the deposition thickness when the object to be formed is formed. That is, the cross-sectional bodies are sliced from the model data at a thickness pitch corresponding to the thickness of one layer of the ink that is deposited in the direction of the vertical axis, and data of the cross-sectional shape and the coloring region is created. That is, the layer body of a cross section sliced from the model data is segmented in a grid pattern and converted to cross-sectional data that has color information at each location on each layer. The data of the object to be formed may be colored three-dimensional model data created with a general three-dimensional CAD modeling software. The shape data and texture measured by a three-dimensional shape input device may be used.

The drive controller 2 obtains the cross-sectional data from the computer 1, gives drive commands to the XY-direction driver 3, the Z-direction driver 8, and the drivers of the ultraviolet light emitters 5, the nozzle head 4, and the stage 7 based on the cross-sectional data, and controls the motion of these devices to deposit the cross-sectional shape of each layer onto the stage 7. The drive controller 2 performs data conversion of the cross-sectional data such as gradation conversion with non-illustrated data converter and generates information of, for example, the layer shape suitable for the size of the liquid droplet extruded from each extrusion nozzle and the color. The drive controller 2 supplies the drive command to the XY-direction driver 3 in accordance with the layer shape and the color information generated by the data conversion so that the nozzle head 4 is moved in a predetermined direction, and the ink is extruded from each extrusion nozzle as required in accordance with the movement of the nozzle head 4. The nozzle head 4 receives the command from the drive controller 2 and extrudes the ultraviolet curable ink in small droplets so that a three-dimensional object 10 is formed on the stage 7 based on the cross-sectional data supplied from the computer 1.

When the drive controller 2 performs a predetermined gradation conversion, the multi-valued gradation data included in the cross-sectional data is converted to binarized data correlated to each location on each layer. The binarized data is the information for performing on/off control of each nozzle of the nozzle head 4. The gradation is represented by changing the density of extremely small dots extruded to each layer, and the color is represented by combining the colors of the dots. Thus, the position of the dots jetted to each layer is determined in accordance with a predetermined density resolution. In a case in which the cross-sectional data includes 256 gradations and is converted to binarized data for on/off control without decreasing the gradation, 256 extrusion regions are set within a certain region.

In a case in which the same gradation is to be expressed in certain regions adjacent to each other, if the extrusion patterns are the same and are arranged regularly, patterns not intended to be on the object to be formed may possibly appear on the surface decoration layer 11 of the three-dimensional object 10. To avoid such a situation, even if the same gradations are to be expressed, the dot position in each layer is preferably varied. In this case, the drive controller 2 functions as an extrusion pattern determiner and varies the extrusion pattern from each extrusion nozzle to avoid the patterns not intended to be on the object to be formed from appearing on the three-dimensional object 10.

The XY-direction driver 3 is driver provided to move the nozzle head 4 in a plane specified by two axes, that is, X-axis and Y-axis orthogonal to each other on a horizontal plane. The XY-direction driver 3 moves the nozzle head 4 within a drive range on the plane to any given position in response to the drive command from the drive controller 2. The movement of the nozzle head 4 with respect to the stage 7 may be relative movement, or the nozzle head 4 may be secured while allowing the stage 7 to be horizontally moved in the XY-plane.

Z-direction

The driver 8 includes driver that moves the stage 7 in the direction of the vertical axis (Z-axis) and lowers the stage 7 in response to the drive command from the drive controller 2 every time one layer of the three-dimensional object 10 or a plurality of layers of the three-dimensional object 10 are formed on the stage 7. The movement of the stage 7 prevents the three-dimensional object 10 additively generated on the stage 7 from being in contact with the nozzle head 4 and keeps a certain gap between the three-dimensional object 10 and the nozzle head 4. As long as the stage 7 is lifted and lowered relative to the nozzle head 4, depending on the circumstances, the stage 7 may be secured while allowing the nozzle head to be lifted and lowered.

The nozzle head 4 is mounted on the XY-direction driver 3 and is freely movable within the XY-plane. The nozzle head 4 includes a plurality of nozzles that extrude decoration material and formation material, which are UV curable inks in this embodiment, supplied from the tanks 6. Each nozzle is individually controlled by the drive controller 2 to inject the ultraviolet curable ink in fine liquid droplets onto calculated positions on the stage 7 or on the three-dimensional object 10 that is being formed on the stage 7.

Thus, according to the apparatus configured as described above, the surface decoration and the formation of the three-dimensional object 10 in the formation process of the three-dimensional object 10 are continuously executed by extruding Y, M, C, and CL inks based on the color information derived from the object to be formed when the ink is extruded for the colored portion of the three-dimensional object 10 and further extruding W ink for the internal formation region 12.

Figure 2:
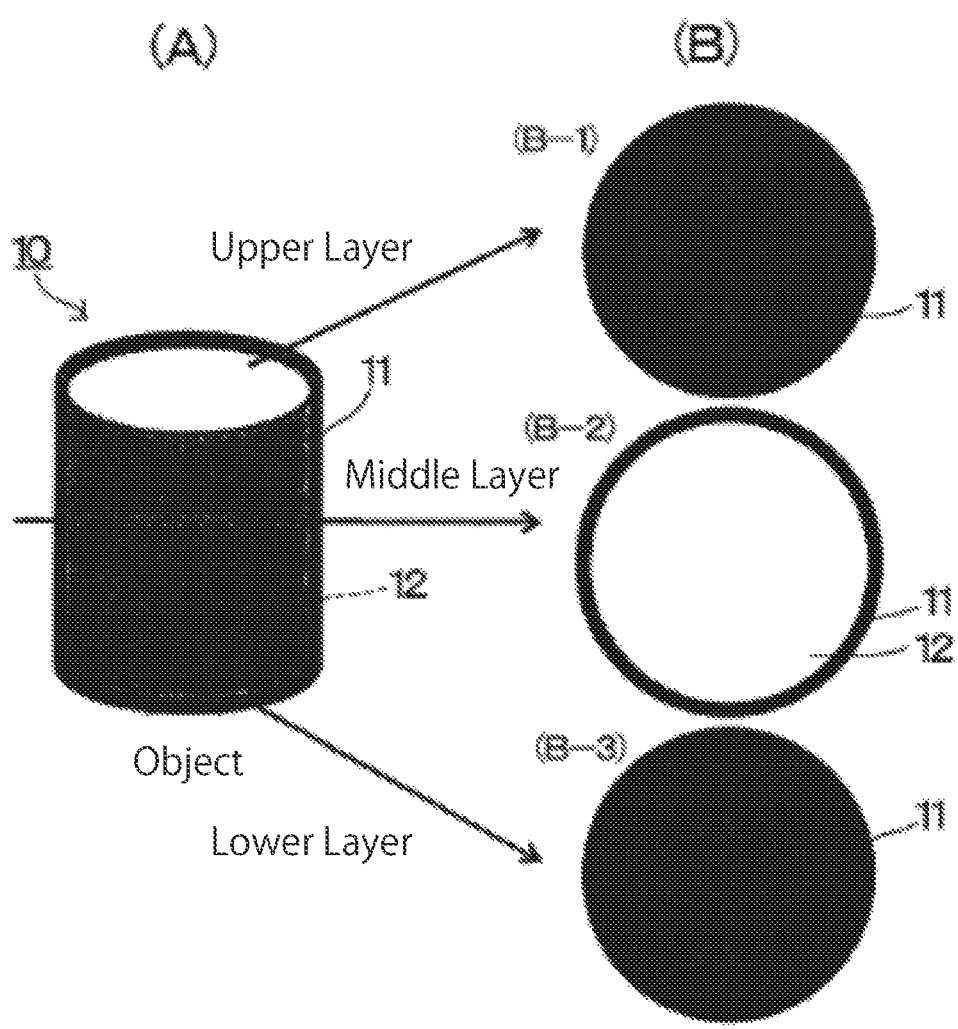
FIG. 2 is a diagram illustrating an exemplary three-dimensional object according to the present invention.

Hereinafter, a method for forming the surface-decorated three-dimensional object using the apparatus illustrated in FIG. 8 will be described referring to an example in which the columnar three-dimensional object 10 illustrated in FIG. 2 is obtained.

First, the stage 7 is lifted to a position suitable for extruding and forming the cross-sectional shape of the first layer, that is, the first layer body. Thus, the positional relationship between the stage 7 and the nozzle head 4 is set to a predetermined positional relationship. Thus, the ink extruded from each extrusion nozzle of the nozzle head 4 is adhered to a suitable position on the stage 7.

When the movement of the stage 7 is finished, the XY-direction driver 3 is driven in accordance with the information generated by the drive controller 2 based on the cross-sectional data from the computer 1 so that the nozzle head 4 is moved to a predetermined direction, and the ink is extruded from each extrusion nozzle as required. The information includes, for example, the layer shape suitable for the size of the liquid droplet extruded from each extrusion nozzle and the color. The surface decoration ink 13 and the clear ink 14 are used to deposit circular layers in the direction of the vertical axis (lifting and lowering direction of the stage 7) by 30 layers (350 µm) (refer to FIG. 2(B-3)). At this time, the depth of the color in each layer is determined to be evenly divided equal density such that when 30 layers are built up on one another, the object is perceived to have the color of a desired depth. That is, the color per one layer is lightened so that the color is completed by depositing 30 layers one above the other.

The surface decoration ink 13 and the clear ink 14 extruded on the stage 7 are instantly cured by the corresponding energy. When the UV curable ink is used, the surface decoration ink 13 and the clear ink 14 are instantly solidified by exposure to the ultraviolet light from the UV lamps 5, which are located on both ends of the head in the main scanning direction. Although not illustrated, when the EB curable ink is used, the surface decoration ink 13 and the clear ink 14 are instantly solidified by receiving electron beam from EB emitting devices located on both ends of the head in the main scanning direction. Alternatively, when the thermosetting ink is used, the thermosetting ink solidifies from the molten state and is cured by natural dissipation or by being cooled with non-illustrated cooler provided on the inner side of the stage.

When one main scanning stroke is completed in this manner, depending on the relationship between the main scanning width of the head and the width of the three-dimensional object 10, the head is moved in the sub-scanning direction as required, and the main scanning is further repeated on the same plane. This forms one plane, or one layer body, which is a cross-sectional body corresponding to one layer of the three-dimensional object 10.

When formation of one layer is finished, the drive controller 2 determines that the formation of one layer has been finished and lowers the stage 7 by the dimension corresponding to the height of one layer that has been formed to correct the positional relationship between the nozzle head 4 and the object deposited on the stage 7 in the formation of the next layer to an appropriate positional relationship. The surface decoration ink 13 and the clear ink 14 are extruded from the ink-jet head again to form a circular layer onto the circular object previously formed. This is repeated for 30 layers to deposit the circular surface decoration layer (bottom surface) 11 formed of the surface decoration ink 13 and the clear ink 14 (refer to FIG. 2(B-3)).

Subsequently, the annular surface decoration layer 11 that forms the outline and the solid circular internal formation region 12 are continuously formed by the ink-jet printer (refer to FIG. 2(B-2)). This formation process includes forming the annular surface decoration layer 11 including 30 layers and the circular internal formation region 12 by one main scanning stroke. More specifically, first, the surface decoration layer 11, which includes 30 layers and is made of the surface decoration ink 13 and the clear ink 14, is formed in an arcuate form in the main scanning direction. Simultaneously, the internal formation region 12, which is made of the white ink 15, is formed inside the surface decoration layer 11. At the point in time when a portion corresponding to a semicircle has been covered by jetting, the surface decoration layer 11 is formed such that the arc is closed, and the internal formation region 12, which is made of the white ink 15, is formed inside the surface decoration layer 11. That is, one plane (layer body) is formed in which the surface of the internal formation region 12, which is formed of the white ink 15, is covered with the surface decoration layer 11, which includes 30 layers. Of course, depending on the relationship between the width of the head in the main scanning direction and the width of the three-dimensional object 10, one plane, or one layer body, which is the cross-sectional body corresponding to one layer of the three-dimensional object 10, may be formed by further repeating the main scanning on the same plane after moving the head in the sub-scanning direction as required.

The formation of the layer body is repeated while moving the stage 7 by the number of the layers corresponding to the height of the three-dimensional object 10. That is, the above-described operation is repeated by the number of the cross-sectional bodies sliced from the model data so that the layer bodies are successively deposited layer by layer on the stage 7 until finally the object to be formed, which is the three-dimensional object 10 in this embodiment, is formed on the stage 7.

The surface decoration ink 13 and the clear ink 14 are used again to deposit the circular surface decoration layer 11 including 30 layers (350 μm) (refer to (FIG. 2(B-1)) to form the surface decoration layer 11 on the upper surface.

Consequently, the three-dimensional object 10 illustrated in FIG. 2(A) is formed in which the entire surface of the internal formation region 12 is covered with 30 layers of the surface decoration layer (not only colored, but also including designs such as patterns) 11. According to this three-dimensional object 10, the granular appearance is reduced by dispersing dots for coloring in the layer direction, that is, the depth direction, and although the surface decoration layer 11 is thick, the three-dimensional object 10 is inhibited from being perceived as existing in the water. Even if hitting displacement occurs, the white color of the internal formation region is hard to be exposed since the surface decoration layer 11 is thick. Thus, high accuracy is not required during formation of the decoration layer, and production becomes easy.

Although the above-described embodiment is a preferred embodiment of the present invention, the present invention is not intended to be limited to this embodiment. In the present invention, the embodiment can be implemented in various other manners without departing from the subject matter of the invention. It is a subject of the above embodiment to increase the thickness of the decoration layer on the surface of the three-dimensional object. However, the granular appearance of the surface decoration layer may become a problem. More specifically, in a case in which the positions at which the dots are jetted in each layer are determined using a dither matrix, generally, when the ink density is determined, the positions of the dots jetted to the cells of the matrix for each layer are previously determined by the dither matrix. As a result, in a case in which a plurality of layers are deposited, dots are further jetted at the same positions on the upper layer. Thus, the dot positions are aligned, which increases the granular appearance. Therefore, it has been proposed to perform a process to shift the positions of the dots per each layer by, for example, changing the dither matrix between the layers such that the color dots are not aligned. This reduces the alignment of the dots and reduces the difference in the brightness between the surface decoration layer and the internal formation region, which is white. In this manner, the granular appearance may be reduced. The statement that the ink is jetted while displacing the dot positions per each layer in the thickness direction refers to a case in which the ink is jetted with the dot positions completely displaced and a case in which the ink is jetted with the dot positions slightly displaced such that the dot positions are partially overlapped. The process for displacing the dot positions does not necessarily have to be performed in all the layers, but may be performed in some of the layers. This also has an advantage.

Hereinafter, the configuration in which the dot positions are displaced each layer by layer is described in more detail. As described above, to reduce the granular appearance, the dot positions are preferably displaced each layer by layer. In this case, in the plurality of layers constituting the surface decoration layer 11, the dot positions of the coloring material 13 of the same color are preferably set to avoid being aligned between the layer bodies of at least two adjacent layers. With this configuration, the dot positions of the coloring material 13 of the same color are displaced in a suitable manner to reduce the difference in the brightness between the surface decoration layer and the layer of the white material 15, which functions as a substrate on which the color is represented, in a suitable manner. This also makes the individual dots of the coloring materials 13 to be inconspicuous and reduces, for example, the granular appearance in a suitable manner.

FIG. 1 illustrates a case in which the dot positions of the coloring materials 13 of the same color are displaced each layer by layer in the plurality of layers constituting the surface decoration layer 11. In this case, the dot positions of the coloring materials 13 may be displaced regularly or randomly. Alternatively, as illustrated in FIG. 1, the dot positions of the coloring materials 13 in some of the layers may be displaced randomly, and the dot positions of the coloring materials 13 in other layers may be displaced regularly. More specifically, FIG. 1 illustrates a configuration in which the dot positions of the coloring materials 13 are displaced randomly in the plurality of layers close to the surface of the three-dimensional object, and the dot positions of the coloring materials 13 are displaced regularly in the internal layers.

A specific method for controlling such that the dot positions of the coloring materials do not align with one another may include a method in which a mask (dither mask) that selects the dot positions is moved each layer by layer. In this case, more specifically, the mask may be, for example, translated or rotated. Translating the mask refers to a method for shifting the dot positions by moving the position of the mask each layer by layer. Also, moving the position of the mask may include moving the starting point at which the mask is applied. In this case, the mask may be moved in any one of an X-direction only, a Y-direction only, and XY-directions simultaneously, or may be moved in a direction in which these directions are mixed. The X-direction and the Y-direction refer to the directions of the X-axis and the Y-axis of the XY-direction driver 3. The moving amount may be fixed (regular) or a variable (random). The method in which the mask is rotated refers to a method in which the dot positions are shifted by rotating the mask each layer by layer. In this case, the rotational angle may be set to any angle as required. The rotation amount may be fixed (regular) or a variable (random).

Instead of the method in which the mask is moved or rotated, the dot positions may also be displaced by a method (variable mask) in which the type of the mask (mask type) that is used is changed each layer by layer. In this case, a plurality of masks (dither matrix) may be prepared in advance, and a different mask may be used in each layer. Alternatively, instead of a mask created by a matrix on the two-dimensional plane, for example, a method that uses a three-dimensional mask (such as a three-dimensional dither mask) created in three-dimension may be employed. Furthermore, when an error diffusion is used, for example, a method (random error diffusion) that allows the weight (a variable) of the error diffusion to be variable each layer by layer and displaces the dot positions by changing the weight may be employed. In this case, the weight may be changed regularly or randomly. Alternatively, for example, a method for displacing the dot positions by performing the error diffusion in three-dimension may be employed (three-dimensional error diffusion).

In a case in which the density of the pigment of the surface decoration ink (coloring material) itself is reduced to prepare light ink, and the color of a desired depth is to be reproduced by increasing the number of the dots, the granular appearance is inhibited or reduced without performing the above-described process for displacing the dot positions of each layer such that the dot positions are not aligned in the layer direction. Furthermore, the granular appearance is reduced with a color, such as yellow, that has a small difference in the brightness with respect to white. Thus, with such a color, the process for displacing the dot positions each layer by layer may be unnecessary. That is, if the difference in the brightness between the white material and the coloring materials is small, the granular appearance is reduced.

In the above-described embodiment, the entire internal formation region 12 is formed with the white ink 15, and the surface decoration layer 11 is formed with process inks of four colors Y, M, C, and if necessary K or by further adding other colors to form multiple layers (for example, 30 layers). However, the invention is not particularly limited to this configuration. It is sufficient if at least the lowermost layer of the surface decoration layer 11 or the layer of the internal formation region 12 adjacent to the surface decoration layer 11 is formed with only the white ink 15. The ink that forms the internal formation region 12 is not limited to only the white ink, but may be coloring inks other than white or a transparent ink. That is, any configuration may be sufficient as long as a white layer exists at the boundary between the surface decoration layer 11, which is formed by building a plurality of layers one above the other, and the internal formation region 12.

This embodiment may further be modified besides the above-described modification. For example, the outermost circumferential portion of the three-dimensional object 10 may include a transparent layer formed of the clear material 14. With this configuration, the surface decoration layer 11 is protected in a more suitable manner by coating the outer side of the surface decoration layer 11 with a clear layer. In other words, the outermost circumference of the surface decoration layer 11 may be formed with only the clear material 14.

Furthermore, in the above description, for example, the feature of the surface decoration layer 11 is described focusing mainly on the surface decoration layer 11 formed on the uppermost section of the three-dimensional object 10. However, as illustrated in FIG. 2(B-2) and other figures, in this embodiment, the surface decoration layer 11 is formed also on the side section of the three-dimensional object 10. The surface decoration layer 11 on the side section may be formed such that the state of the surface decoration layer 11 viewed from the direction perpendicular to the side surface is the same or similar to the surface decoration layer 11 formed on the uppermost section of the three-dimensional object 10. The surface decoration layer 11 on the bottom section of the three-dimensional object 10 may also be formed such that the state of the surface decoration layer 11 viewed from the bottom side is the same or similar to the surface decoration layer 11 formed at the uppermost section of the three-dimensional object 10. With this configuration, the surface decoration layer 11 on the side surface and on the bottom surface is formed in a suitable manner.

Example 1

The three-dimensional structure illustrated in FIG. 2 was produced by the ink-jet printer UJF-3042HG manufactured by MIMAKI ENGINEERING CO., LTD. using the UV (ultraviolet light) curable inks of white (trade name, UV ink LH-100W: product No. SPC-0597W), cyan (trade name, UV ink LH-100C: product No. SPC-0597C), magenta (trade name, UV ink LH-100M: product No. SPC-0597M), yellow (trade name, UV ink LH-100Y: product No. SPC-0597Y), and clear (UV ink LH-100CL: product No. SPC-0597CL) manufactured by MIMAKI ENGINEERING CO., LTD., and the coloring performance evaluation test was conducted.

Figure 3:
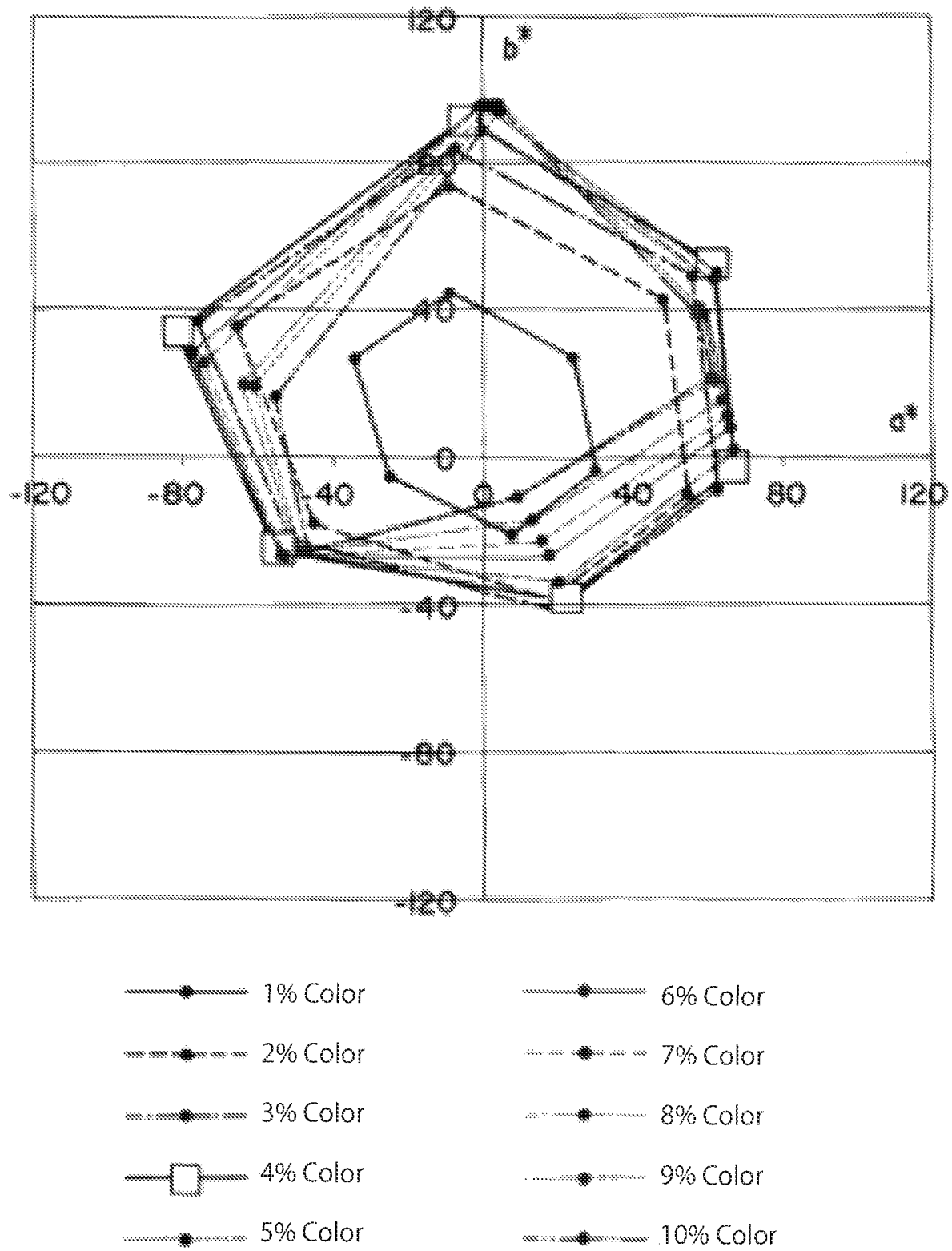
FIG. 3 is a gamut represented by a coordinate system including a*-axis and b*-axis illustrating the coloring performance evaluation result when the coating thickness is 350 μm (30 layers) (the color was evaluated when mixing 100% clear ink with 1 to 10% coloring ink represented in the ink print density per one layer).
Figure 4:
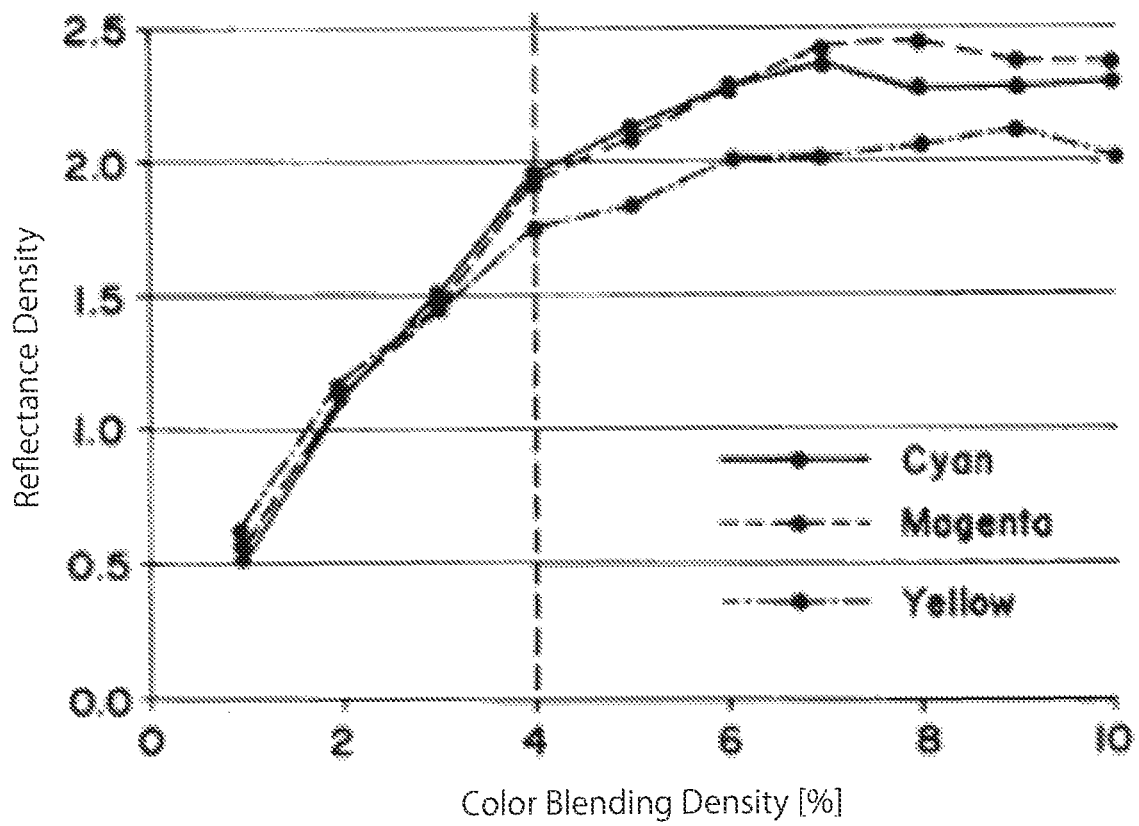
FIG. 4 is a graph illustrating a relationship between the color blending density and the reflectance density illustrating the coloring performance evaluation result when the coating thickness is 350 μm (30 layers) (the color was evaluated when mixing 100% clear ink with 1 to 10% coloring ink represented in the ink print density per one layer).

First, a decoration layer of approximately 350 km with 30 layers was formed. The coloring performance evaluation test was conducted for a case in which the coating thickness is 350 μm (30 layers: UJF-3042HG720×600 dpi 3 drop ND). The result is illustrated in FIG. 3. The test evaluated the color obtained by mixing 100% clear ink with 1 to 10% surface decoration ink represented in the ink print density per one layer. According to the evaluation results, it has been confirmed that the gamut had tendency to widen and become brighter as the color blending density per one layer was increased from 1%. In contrast, when the color blending density exceeds 4%, the gamut started to narrow again and became dark. When the color blending density was 4%, the reflectance density was approximately two as illustrated in FIG. 4. Thus, with the UV ink in this embodiment, it was determined that the coloring performance was the best when the color blending density was 4%.

Figure 5:
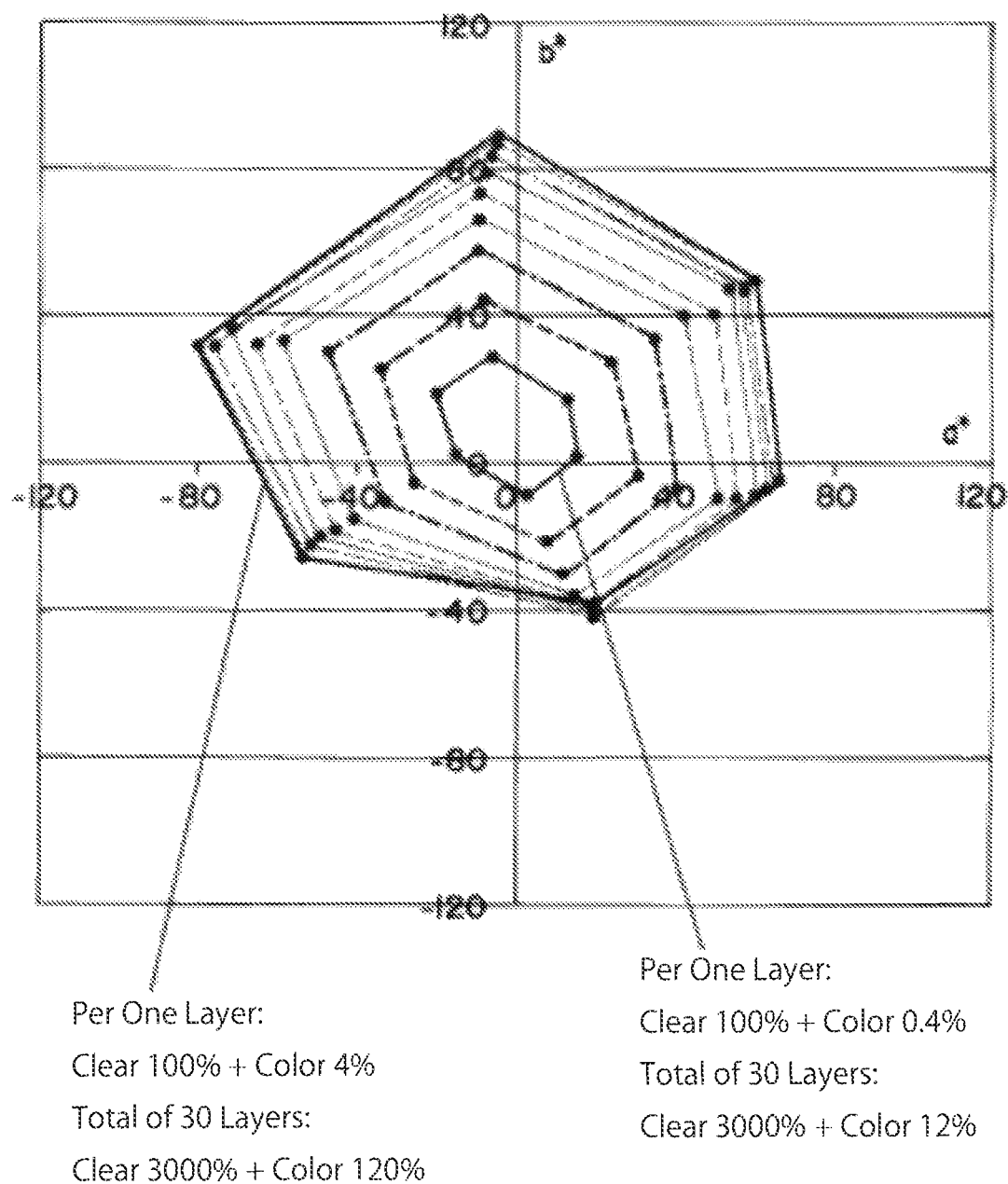
FIG. 5 is a gamut represented by a coordinate system including a*-axis and b*-axis illustrating the gradation evaluation result when the coating thickness is 350 μm (30 layers) (the color was evaluated when mixing 100% clear ink with 0.4 to 4% coloring ink represented in the ink print density per one layer (the ink limit being set to 4%)).
Figure 6:
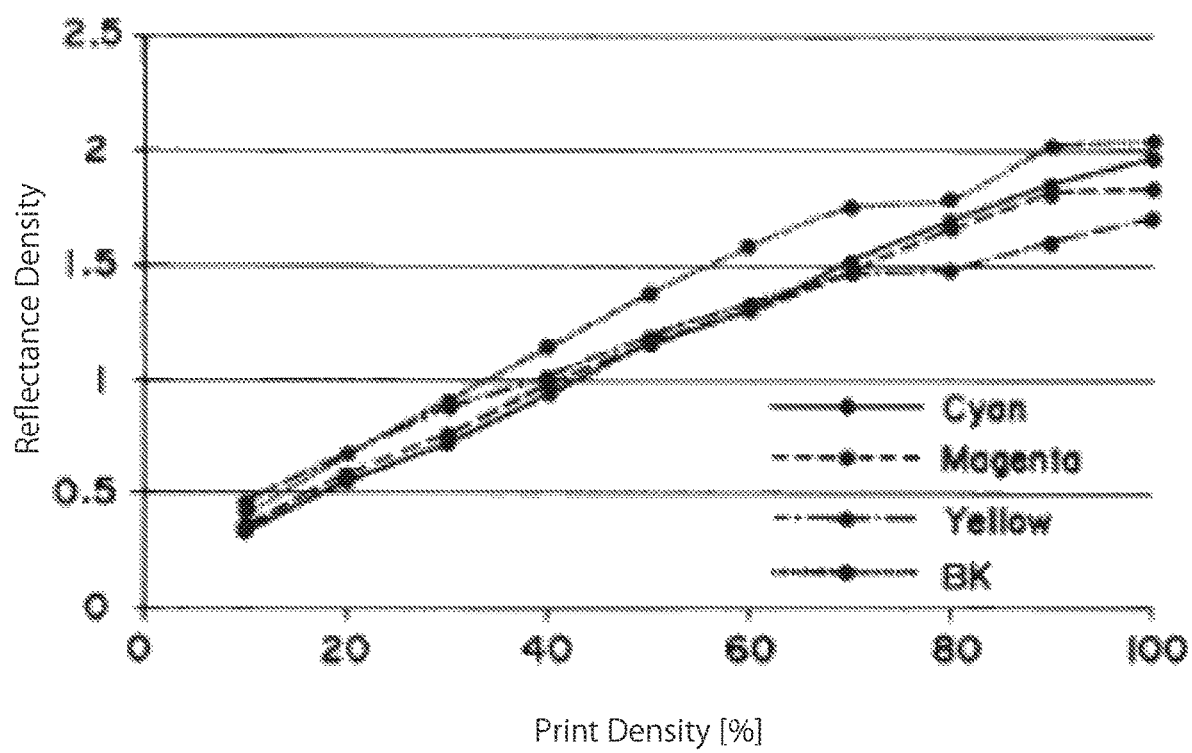
FIG. 6 is a graph illustrating a relationship between the print density and the reflectance density illustrating the gradation evaluation result when the coating thickness is 350 μm (30 layers) (the color was evaluated when mixing 100% clear ink with 0.4 to 4% coloring ink represented in the ink print density per one layer (the ink limit being set to 4%)).

Thus, the color was evaluated when 100% clear ink was mixed with 0.4% to 4% surface decoration ink (a state in which the ink limit is set to 4%) represented in the ink print density per one layer. In this case, as illustrated in FIG. 5, the gamut was the widest when 100% clear ink was mixed with 4% coloring ink per one layer (the total of 30 layers: 3000% clear ink mixed with 120% coloring ink), and the gamut narrowed as the color blending amount was gradually reduced, which was clearly distinguished. The gamut was the narrowest when 100% clear ink was mixed with 0.4% coloring ink per one layer (the total of 30 layers: 3000% clear ink mixed with 12% coloring ink). The relationship between the print density and the reflectance density was found to be in a linear correlation as illustrated in FIG. 6, in which as the print density was increased, the reflectance density was increased. Thus, the gradation evaluation result when the coating thickness was 350 μm (30 layers: UJF-3042HG720×600 dpi 3 drop ND) indicated that the widening of the gamut showed the tendency of reaching the limit with the color blending density of 4%, but the reflectance density was linearly increased. This suggests that the gradation representation is generally available. In the above-described evaluation test, an example was provided using the cyan (C) surface decoration ink (trade name, UV ink LH-100, product No. SPC-0597C). However, the same results were obtained using other colors, that is, the magenta (M) surface decoration ink (trade name, UV ink LH-100, product No. SPC-0597M) and the yellow (Y) surface decoration ink (trade name, UV ink LH-100, product No. SPC-0597Y).

From these facts, it has been proved that although the thickness is increased by depositing light color one above the other, the color can be reproduced as a color not excessively deep, that is, although the thickness of the surface decoration layer is increased, the color having the same depth as the case in which the surface decoration layer is formed with one layer is obtained, and the color does not become dark. This is achieved by dividing the surface decoration ink having the depth that generally completes the color by one layer in the depth direction (the layer direction toward the internal formation region), extruding the divided surface decoration ink so that the amount of discharge of the surface decoration ink (surface decoration material) per each layer is reduced, and providing the clear ink (clear material) to compensate for the reduced amount so that the coating thickness is increased.

Figure 7:
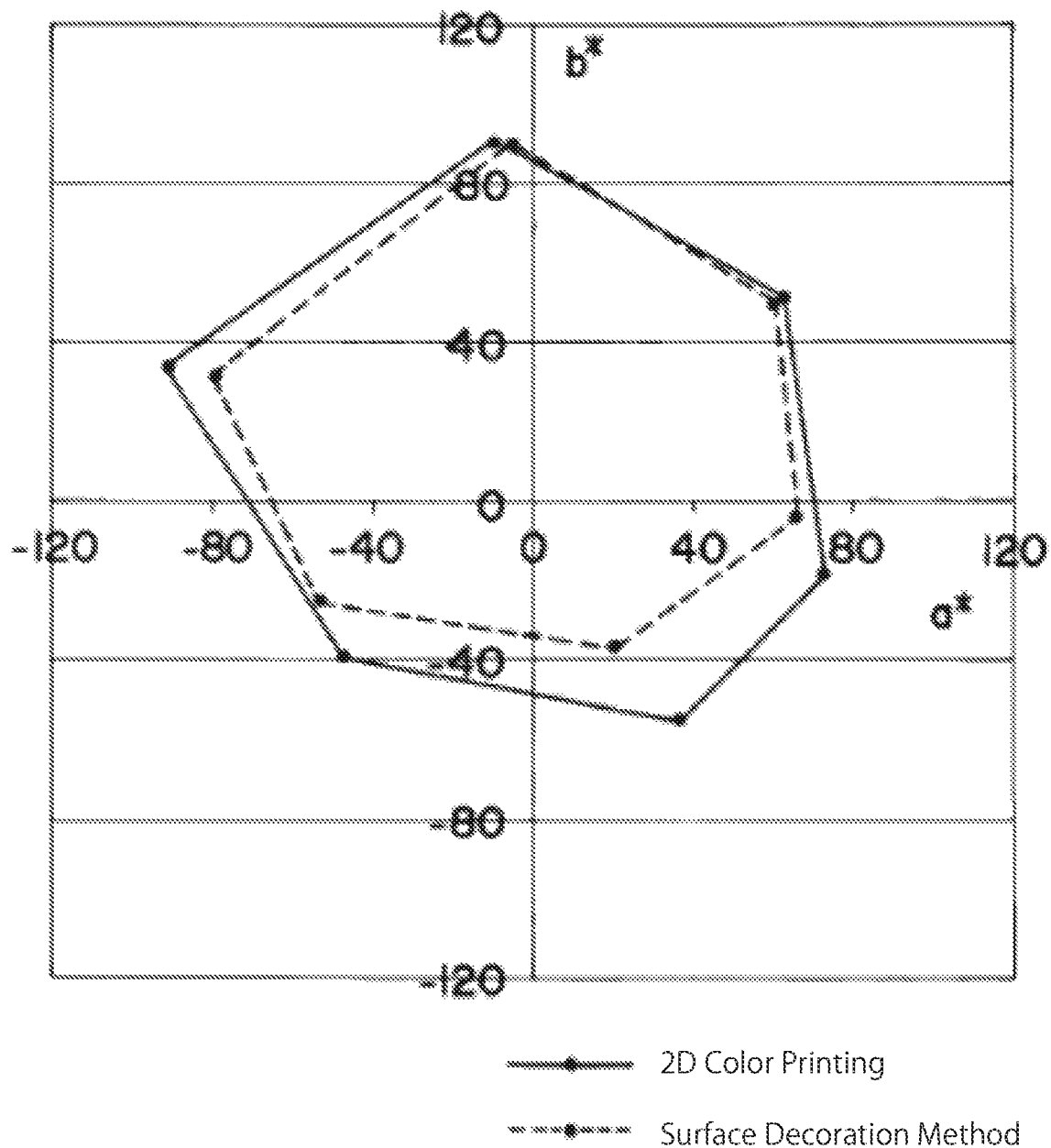
FIG. 7 is a gamut represented by a coordinate system including a*-axis and b*-axis comparing the color reproducibility of the 2D color printing and the surface decoration of the surface-decorated three-dimensional object according to the present invention.

This is also substantiated by the color reproducibility comparison between the 2D color printing and the surface-decorated three-dimensional object of this embodiment illustrated in FIG. 7. When the gamut area ratio in 2D color printing is assumed to be 100%, the gamut area ratio of the surface-decorated three-dimensional object of this embodiment was 79.1%. This suggests that the color reproducibility with wide gamut is achieved. The reproduction ratio of the color reproducibility calculated based on the color printing ink of Pantone Inc. USA, which serves as the color swatch, was 93.2% in 2D color printing and 85.2% in this embodiment, which is comparable.

It has become clear from the above evaluation that, according to the surface-decorated three-dimensional object of the present invention, although the surface decoration layer is multilayered to increase the thickness, good coloring performance is achieved, and the gradation is reliably represented. Thus, the tone and the gradation of the color are represented with the constant coating thickness.

The invention claimed is:

1. A method for producing a three-dimensional object, the method comprising:

extruding a plurality of materials in particles to form a plurality of layer bodies one above the other, the plurality of layer bodies corresponding to cross-sections obtained by slicing an object to be formed into a plurality of parallel surfaces, the plurality of layer bodies comprising a surface decoration region for decorating a surface of the three-dimensional object and an internal formation region constituting an internal portion of the three-dimensional object, the plurality of materials comprising a white material, at least one coloring material other than white, and a transparent material that solidify in accordance with a predetermined condition after being extruded from a nozzle, extruding the plurality of materials comprising:

forming the surface decoration region using the at least one coloring material and the transparent material, the surface decoration region comprising the plurality of layer bodies formed by building the plurality of layer bodies one above the other; and forming at least one of the layer bodies with the white material in at least one location selected from a group consisting of a lowermost layer body in the plurality of layer bodies constituting the surface decoration region and a region of the internal formation region close to the surface decoration region; and successively depositing the plurality of layer bodies to form the three-dimensional object, wherein, the plurality of layer bodies constituting the surface decoration region comprise a first set of the plurality of layer bodies and a second set of the plurality of layer bodies, the first set of the plurality of layer bodies being closer to the surface of the three-dimensional object than the second set of the plurality of layer bodies are, the second set of the plurality of layer bodies being closer to the internal portion of the three-dimensional object than the first set of the plurality of layer bodies are, and the forming of the surface decoration region includes, in the plurality of layer bodies constituting the surface decoration region in which the at least one coloring material and the transparent material are mixed, randomly displacing dot positions of the at least one coloring material in the first set of the plurality of layer bodies and regularly displacing the dot positions of the at least one coloring material in the second set of the plurality of layer bodies.

2. The method for producing the three-dimensional object according to claim 1, wherein the at least one coloring material in each of the plurality of layer bodies constituting the surface decoration region is displaced such that a density of a color in the each of the plurality of layer bodies constituting the surface decoration region becomes a density obtained by equally dividing a predetermined desired density.

3. The method for producing the three-dimensional object according to claim 1, wherein, when an average diameter of a dot of the at least one coloring material formed by a liquid droplet that is extruded from the nozzle and is solidified is compared with the thickness of the surface decoration region formed by depositing the plurality of layer bodies, the thickness of the surface decoration region is greater than the average diameter of the dot.

4. The method for producing the three-dimensional object according to claim 1, wherein the thickness of the surface decoration region formed by depositing the plurality of layer bodies is equal to or more than 50 μm.

5. The method for producing the three-dimensional object according to claim 1, wherein, in the plurality of layer bodies constituting the surface decoration region, the dot positions of the at least one coloring material of a same color are prevented from being aligned among at least two of the plurality of layer bodies adjacent in a deposition direction of the plurality of layer bodies.

6. The method for producing the three-dimensional object according to claim 5, wherein, among the at least two of the plurality of layer bodies adjacent in the deposition direction, the dot positions of the at least one coloring material randomly displaced are prevented from being aligned by moving a mask pattern each layer by layer.

7. The method for producing the three-dimensional object according to claim 1, wherein ultraviolet curable inks are used as the plurality of materials.

8. The method for producing the three-dimensional object according to claim 1, wherein the at least one coloring material in the surface decoration region is randomly displaced by using a mask pattern that selects the dot positions.

9. An apparatus for forming a three-dimensional object by extruding a plurality of materials in particles to form a plurality of layer bodies one above the other, the plurality of layer bodies corresponding to cross-sections obtained by slicing an object to be formed into a plurality of parallel surfaces, the plurality of layer bodies comprising a surface decoration region for decorating a surface of the three-dimensional object and an internal formation region constituting an internal portion of the three-dimensional object, the apparatus comprising:

a nozzle configured to extrude the plurality of materials comprising a white material, at least one coloring material other than white, and a transparent material that solidify in accordance with a predetermined condition after being extruded from the nozzle, the nozzle comprising a white nozzle configured to extrude the white material, a coloring nozzle configured to extrude the at least one coloring material, and a transparent nozzle configured to extrude the transparent material; and a controller that control the white nozzle, the coloring nozzle and the transparent nozzle, wherein the controller is configured to control the white nozzle, the coloring nozzle and the transparent nozzle to:

form the surface decoration region using the at least one coloring material and the transparent material, the surface decoration region comprising the plurality of layer bodies formed by building the plurality of layer bodies one above the other;

form at least one of the layer bodies with the white material in at least one location selected from a group consisting of a the lowermost layer body in the plurality of layer bodies constituting the surface decoration region and a region of the internal formation region close to the surface decoration region; and successively deposit the layer bodies to form the three-dimensional object, wherein the plurality of layer bodies constituting the surface decoration region comprise a first set of the plurality of layer bodies and a second set of the plurality of layer bodies, the first set of the plurality of layer bodies being closer to the surface of the three-dimensional object than the second set of the plurality of layer bodies are, the second set of the plurality of layer bodies being closer to the internal portion of the three-dimensional object than the first set of the plurality of layer bodies are, and wherein, the controller controls the coloring nozzle and the transparent nozzle to, in the plurality of layer bodies constituting the surface decoration region in which the at least one coloring material and the transparent material are mixed, randomly displace dot positions of the at least one coloring material in the first set of the plurality of layer bodies and regularly displace the dot positions of the at least one coloring material in the second set of the plurality of layer bodies.

* * * * *